(12) United States Patent
Reiche

(10) Patent No.: US 8,587,182 B2
(45) Date of Patent: Nov. 19, 2013

(54) ULTRASONIC TRANSDUCER

(75) Inventor: Martin Reiche, Weil der Stadt (DE)

(73) Assignee: Robert Bosch GmbH, Stuttgart (DE)

( * ) Notice: Subject to any disclaimer, the term of this patent is extended or adjusted under 35 U.S.C. 154(b) by 443 days.

(21) Appl. No.: 12/308,300

(22) PCT Filed: Sep. 5, 2007

(86) PCT No.: PCT/EP2007/059270
§ 371 (c)(1),
(2), (4) Date: Aug. 2, 2010

(87) PCT Pub. No.: WO2008/049681
PCT Pub. Date: May 2, 2008

(65) Prior Publication Data
US 2010/0296692 A1    Nov. 25, 2010

(30) Foreign Application Priority Data
Oct. 24, 2006  (DE) .......................... 10 2006 050 037

(51) Int. Cl.
*G10K 9/122* (2006.01)
(52) U.S. Cl.
CPC ..................................... *G10K 9/122* (2013.01)
USPC .......................................... 310/322; 310/326
(58) Field of Classification Search
CPC .... G01K 9/122; B06B 1/0644; B06B 1/0651; B06B 1/0666
USPC .................. 310/322, 334, 348, 326
See application file for complete search history.

(56) References Cited

U.S. PATENT DOCUMENTS

| 4,360,562 | A  | * | 11/1982 | Endo et al. | 428/317.7 |
| 5,457,352 | A  | * | 10/1995 | Muller et al. | 310/327 |
| 6,181,645 | B1 | * | 1/2001 | Li | 367/178 |
| 2002/0003385 | A1 | * | 1/2002 | Jones | 310/334 |
| 2002/0007118 | A1 | * | 1/2002 | Adachi et al. | 600/443 |
| 2003/0085635 | A1 | * | 5/2003 | Davidsen | 310/334 |
| 2003/0121331 | A1 | * | 7/2003 | Mitsuoka et al. | 73/632 |

FOREIGN PATENT DOCUMENTS

| DE | 37 21 209 | 1/1989 |
| DE | 199 12 772 | 10/1999 |
| DE | 199 17 862 | 11/1999 |
| DE | 101 23 612 | 11/2001 |
| DE | 20 2004 003 487 | 5/2004 |
| DE | 103 41 900 | 6/2004 |
| GB | 2 097 630 | 11/1982 |
| RU | 2 139 572 | 10/1999 |
| RU | 2 159 443 | 11/2000 |
| WO | WO 01/61375 | 8/2001 |

\* cited by examiner

*Primary Examiner* — Derek Rosenau
(74) *Attorney, Agent, or Firm* — Kenyon & Kenyon LLP

(57) ABSTRACT

An ultrasonic transducer includes: a diaphragm pot that has a surrounding wall; a transducer element mounted in a diaphragm pot on a transducer section on an inner side of the diaphragm for generating the ultrasonic vibrations; a first damping element situated in the diaphragm pot on transducer element for damping the diaphragm; and a second damping element situated within the diaphragm pot in an edge section of the diaphragm around the transducer element for damping vibrations of the wall; the second damping element being connected with force locking, at least section by section, both to the edge section and to the inner side of the wall.

14 Claims, 3 Drawing Sheets

ULTRASONIC TRANSDUCER

BACKGROUND OF THE INVENTION

1. Field of the Invention

The present invention relates to an ultrasonic transducer for a vehicle and a corresponding method for producing such an ultrasonic transducer.

2. Description of Related Art

Ultrasonic transducers are used in vehicles as parking assistance, for example. The parking assistance includes, for instance, a control device and ultrasound sensors that are provided with such ultrasonic transducers. For this purpose, in particular, transient characteristics of the ultrasonic transducer, for a so-called close range measuring capability, are a decisive functional requirement (for instance at <20 cm). An ultrasonic sensor has a housing into which the ultrasonic transducer is inserted. Such ultrasonic transducers are normally made up of a diaphragm pot and a transducer element situated inside of it. The diaphragm pot is usually formed or cut from a metallic material such as aluminum. It is coated with a primer, for reasons of protection from corrosion and enameling. The electromechanical transducer element (e.g. a piezo element) is applied to the bottom of the housing, for instance, adhered or bonded. The housing is filled with a damping material. One possibility for this is an injected silicone foam. These production steps are technically not trivial, for various reasons, and are therefore not able to be transferred to just any production sites. The chemical process of foaming, in particular, requires exact parameters, and is difficult to realize during manufacturing.

Instead of foaming the internal space of the housing, damping may be achieved by inserting foam parts into the housing. By doing that, it would be easy to replace the production step of foaming by a step that is simple to master. It has become apparent, however, that such sensors thereby acquire unfavorable transient characteristics compared to versions involving foaming, which impairs the decisive functional requirement for close range measuring capability. However, in particular the mechanical frictional connection of the damping material to the wall of the pot and to the diaphragm, over aging and temperature; has to be ensured. This is achievable in the case of insertion parts only by using oversized parts and inserting them in a prestressed position, which means expenditure in production and housing construction which has to absorb the stress. Consequently, a frictional connection by an exact-shape filling is more favorably achievable using liquid materials which harden afterwards.

By measuring the spectral components of the transient processes, it has turned out that a substantial proportion is based on resonances outside the working frequency (48 kHz) of the ultrasonic sensor, in particular, components around 30 kHz and 70 kHz being significant. These are caused by tilting motion and creasing motion operations in the housing wall. Up to now, a remedial measure against this was carried out by thickening the diaphragm pot by putting in a bead at the upper edge of the wall, whereby the wall of the pot is stiffened, but the vibration modes that are excited are not damped. With that, the vibrations at the edge of the pot, or rather the bead, are reflected by faulty adaptation of the mechanical impedance, but they are not converted into thermal energy, whereby damping would occur.

Moreover, for the damping of the housing wall vibrations, housing filling materials are used which are made up of damping materials and/or additionally include such materials. A material such as a strongly damping foaming material, which fills up the inner space of the diaphragm pot with an almost homogeneous consistency, thereby brings about not only great damping of the wall vibrations, but also of the useful vibrations of the diaphragm pot's diaphragm. This leads to a low electroacoustical efficiency of the ultrasonic transducer. The driving electronics, that is, the transmitting current source and the transformer, enter into saturation effects at too great a damping, which additionally reduce the bandwidth of the tuned system transducer/circuit elements.

A further remedial measure is an external decoupling ring that is applied to the wall of the diaphragm pot. It can be shown by measuring technology that, in the case of mass production transducer construction, the wall modes are then almost completely suppressed. The mechanical contact of this decoupling ring with the outer wall of the diaphragm pot is, however, exposed to outer environmental influences, such as soiling, tilting of the sensor in its support or penetrating water.

Published German patent document DE 199 12 772 describes an ultrasonic sensor for measuring separation distances, a diaphragm pot being equipped with an elliptical and circular recess over a transducer element having a plurality of insulators that are layered one over another and are mechanically held in the diaphragm pot by a bore guard ring in an annular groove. A connection to the inner wall is not described. These insulators, for example, are made up of different damping materials such as a silicone disc, felt and cork. The insulators have the shape of the elliptical recess, and completely cover the transducer element.

Published German patent document DE 199 17 862 describes an ultrasonic sensor whose piezoelectric transducer element is covered by a sound-absorbing material. This may be felt, for example. An insulating resin, such as silicone rubber or urethane rubber, seals the piezoelectric transducer element and the sound-absorbing material. The inner space of the diaphragm pot has an elliptical and circular contour. The transducer element is fastened on the diaphragm and surrounded by a ring section which may, for instance, have a thinner wall thickness than the section onto which the transducer element is mounted. In one embodiment, the transducer element and the ring section are completely covered by the sound-absorbing material. In another embodiment, the ring section of the diaphragm surrounding the transducer element is covered by an insulating resin having a very low layer thickness. This may be silicone resin or urethane resin, for example. Hereby the undesired vibration of the ring section is damped by a thinner wall thickness. A connection of this thin damping layer of the insulating resin to the inner wall of the diaphragm pot is not described.

An ultrasonic sensor according to published German patent document DE 103 41 900 has an inner space of a diaphragm pot which, above a transducer element, is filled up in layers with felt and above that with silicone rubber. In the silicone rubber a section is situated made of silicone foam having bubbles. The silicone rubber seals off the diaphragm pot. The felt layer completely covers the transducer element and is completely covered by the silicone rubber.

BRIEF SUMMARY OF THE INVENTION

The ultrasonic transducer according to the present invention, by contrast, has the advantage that a diaphragm pot, in its lower region, up to a determinable height, has a concentric construction made up of a homogeneous material, whose inner region is filled with a weakly damping material, over the piezoelectric ceramic, on the plane of the useful vibration. An additional advantage is that the component parts are designed so that producing the ultrasonic sensor does not have processes that are difficult to master, and manual production is possible in a simple manner.

The basic concept of the present invention is that the ultrasonic transducer has a diaphragm pot which has in its edge region, or ring section about the transducer element, a damping element having strong damping, that is connected in a force-locking manner to the diaphragm and the inner wall, and, above the transducer element, has a further damping element having weak damping.

The region above the transducer element is consequently damped only weakly, and the ring section of the diaphragm situated concentrically about it is strongly damped by the damping element, having high damping, that is situated on top of it with force locking, the inner wall of the diaphragm pot being also connected with force locking to the damping element having high damping. Because of this, in a similar manner to diagonals which brace a parallelogram, the tilting and creasing motions of the wall of the diaphragm pot are taken up, with respect to the diaphragm plane, by the damping element. In this context, the kinetic energy of the undesired vibrations in the damping element are transformed into heat.

The second damping element is situated concentrically about the first damping element, the first damping element having essentially no contact with the inner wall of the diaphragm pot.

This construction is particularly advantageous, since selective damping is available according to functional requirement: Low damping of the useful vibrations and high damping of the wall vibrations.

A special advantage is that the diaphragm pot is able to have a geometry that a mass-production diaphragm pot will have, whereby no new construction is required, and one may revert to proven components having a high quality.

The ultrasonic transducer remains low-resistance at its operating frequency (48 kHz), and thus advantageously efficient. It is controlled using smaller transmission voltages, and has higher generator voltages in microphone operation. The first is equivalent to the lowered risk of a creeping depolarization of the piezoelectric ceramic of the transducer element, and a higher overload limit with respect to transformer and transmitting current source. The latter is equivalent to greater signal-to-noise ratios in microphone operation or reception.

The ultrasonic transducer inclusive of the inner damping construction is able to be produced independently of the housing of the ultrasonic sensor, and is able to be checked with regard to its parameters. Thereby process sequences may advantageously be disentangled (for instance, separate locations for manufacturing the transducer and the sensor), and scrap may be reduced in final sensor testing.

According to the present invention, the ultrasonic transducer, especially for a vehicle, having a diaphragm pot that has a circumferential wall, has the following: a transducer element applied in a diaphragm pot on a transducer section on the inner side of a diaphragm, for generating ultrasound vibrations; a first damping element situated in the diaphragm pot for damping the diaphragm; and a second damping element situated in the diaphragm pot in an edge section of the diaphragm and around the transducer element, for damping vibrations of the wall; the second damping element being connected with force locking to both the edge section and an inner side of the wall, at least from section to section.

The damping of the wall modes advantageously takes place, without the influence or the necessity of an outer decoupling ring, to a level that is almost no longer detectable by measuring technology. With that, the risk of environmental influences on the transition between the decoupling ring and the diaphragm pot wall advantageously disappears.

In another embodiment, in the diaphragm pot, over the first and the second damping elements there is situated a third damping element for the further damping and/or sealing of the diaphragm pot.

In one example embodiment, it is provided that the first damping element and the second damping element are developed as insertion components. This makes both automatic production and manual production advantageously possible. Force locking to the diaphragm and to the wall may be achieved by oversize or mechanical stress, or by adhesion.

Furthermore, in one example embodiment, it is provided that the second damping element has a contour that is complementary to a contour of the diaphragm pot, and has a through hole for accommodating the first damping element. This enables a concentric construction of the two damping elements, the two elements being able advantageously to be prefabricated as insertion parts at a different location.

In one alternative embodiment, the first damping element is developed as an insertion part, the second damping element being produced from a molding material, preferably an elastomer having microballoons, in the diaphragm pot. In this connection, an adjustment and a connection of the second damping element to the diaphragm and the inner wall of the diaphragm pot is possible. Upon casting, there is an exact, full surface force locking to diaphragm and wall, and adhesion depending on the choice of material. The microballoons in the elastomer have the effect of a further advantageous damping of the wall vibrations, these being convertible to thermal energy. In an additional embodiment, the third damping element is developed from a molding material, preferably from a two-component elastomer. In this context, the damping element may advantageously be simply applied.

In an example embodiment, it is provided that the first damping element have a foam material, preferably a closed-pore foam material. This improves a transitional region between the first and the second damping element, since suction of the second damping element in the liquid state into the first damping element does not take place, and thus an advantageously improved transition of the acoustical impedances between these damping elements is achieved. By avoiding the sucking up, such as in the case of a felt material, the location of the border layer of the transition of the impedances of the damping elements is reproducible in a better manner.

In a further alternative embodiment, it is provided that the first damping element is wider at its upper side than at its lower side, the width at its upper side being greater than the width of the through hole in the second damping element. This achieves, for instance, that the first damping element is able to be fastened in the through hole of the second damping element, in an advantageously simple manner, by prestressing caused by its conical shape and without any further auxiliary means, such as an adhesive layer.

In still another alternative embodiment, the third damping element is developed in one piece with the second damping element. In this case, the same material may be used, and an operational step may advantageously be saved.

In a further embodiment, it is provided that the first and second damping element have a previously defined height, as measured perpendicularly from the inner side of the diaphragm. In this instance, the height is preferably equal for both elements. This brings about an advantageously concentric construction, the third damping element advantageously lying flat on the first and second damping element.

The principle of these damping superstructures includes diaphragm superstructures, in which the piezoelectric transducer lies on a platform or is applied in a recess.

A method according to the present invention, for producing an ultrasonic transducer according to the present invention, has the following method steps:

(S1) Inserting the second damping element in the diaphragm pot, the second damping element being connected with force locking to the inner wall of the diaphragm pot and the edge region of the inner side of the diaphragm of the diaphragm pot; and (S2) Fitting the first damping element into the through hole of the second damping element or fitting the first damping element into the through hole of the second damping element and closing the diaphragm pot using the third damping element, to produce the ultrasonic transducer.

It is advantageously achieved, in this instance, that an ultrasonic transducer is produced that has transient characteristics corresponding to requirements, using simple and few production steps, along with a savings in time. A costly new construction of the diaphragm pot is not required. The advantage is that a foam process that is difficult to master is replaced by a simple, mechanical filling process. The acoustical property of the elastomer to be filled in is predefined by its parameters (density, Shore hardness, diameter of the microballoons), and does not change any more because of, for instance, a thermal curing process.

In one alternative embodiment, it is provided that, before the insertion of the second damping element, a core of the shape and the dimensions of the first damping element is applied to the transducer element so as to be removable, and the second damping element is applied as a pourable material into the region between this core and the inner wall of the diaphragm pot, and after the curing of the second damping element, the core being removed to form the through hole. Because of that, simple and known filling processes are advantageously usable. A force-locking connection between the second damping element and the diaphragm as well as the diaphragm pot inner wall advantageously requires no additional connecting material, such as an adhesive.

One alternative method according to the present invention, for producing an ultrasonic transducer according to the present invention, has the following method steps:

(S1) Inserting the first damping element in the diaphragm pot, the first damping element being fastened to the transducer element; and (S2) Pouring the second damping element into the region between the first damping element and the inner wall of the diaphragm pot, or pouring the first damping element into the region between the first damping element and the inner wall of the diaphragm pot and closing the diaphragm pot using the third damping element to produce the ultrasonic transducer.

In this version, the advantage is that the core for the second damping element that is to be poured in forms a so-called "lost form", and is the first damping element, it being able advantageously to remain in place.

In an additional example embodiment, it is provided that the closing of the diaphragm pot takes place by further pouring of material of the second damping element into the diaphragm pot, to form the third damping element. In this case, the material of the second damping element is advantageously also used for the third damping element. The casting of the second and third damping element then advantageously takes place in only one production step. The following additional advantages come about.

The reaction equilibrium, that is difficult to master, between propellant expansion and adhesion of a silicone in the foam process of same is replaced by a simple mechanical set-in process or fill-in process. In the case of the filling material, the acoustically relative data, such as Shore hardness, density and the like are predefined and not dependent upon the vulcanization process.

The first and second damping element in the form of an insertion part is produced in an advantageously simple manner, for instance, by stamping.

Doing without the bead on the housing means advantages in the raw production of the housing by extrusion.

Because of the high transmission efficiency and the improved noise to interference ratio during receiving, the ultrasonic transducer according to the present invention is well suited realizing greater operating ranges for broadened functions such as parking gap measuring, monitoring blind spots, LSF, etc.

DETAILED DESCRIPTION OF THE INVENTION

Figure 1:
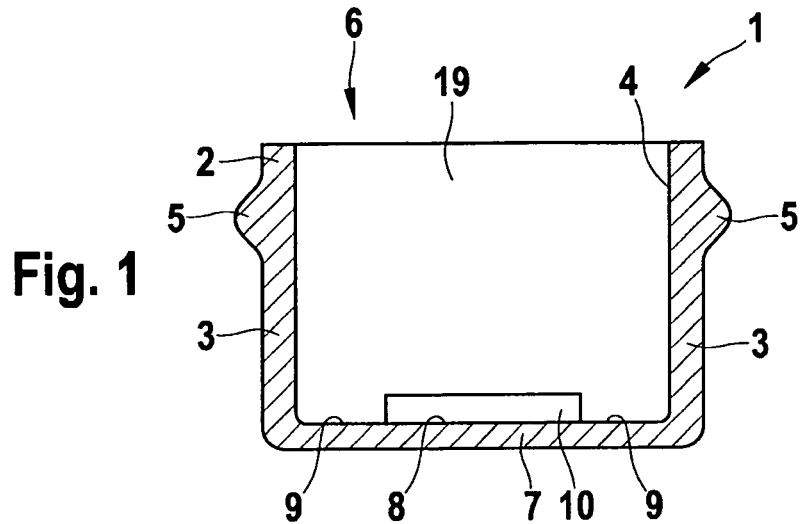
FIG. 1 shows a schematic sectional representation of an exemplary diaphragm pot of an ultrasonic transducer.

The same or similar component parts having the same or similar functions are provided with the same reference numerals in the figures.

FIG. 1 shows an ultrasonic transducer 1 according to the present invention, in a sectional representation as a customary embodiment, in a first step, before filling with damping elements. A diaphragm pot 2, preferably having a cylindrical form, has an encompassing wall 3 having a diaphragm 7 lying at the bottom. Furthermore, diaphragm pot 2 has at its upper end an opening 6, which, for example, has a certain contour 11' (see FIG. 4). On the outside of diaphragm pot 2, an enlargement 5 is situated near the opening which, for instance, is provided for connection with a holding element that is not shown and/or a decoupling ring. In this example, diaphragm pot 2 is an extruded aluminum part.

The encompassing wall of diaphragm pot 2 encloses an inner space 19, inside of which, on the inside of diaphragm 7, a transducer element 8, for instance, a piezotransducer, is applied to a transducer section 8, for example, using an adhesive. Transducer section 8 is situated concentrically about the center axis of diaphragm pot 2 and is surrounded by an edge section 9.

Figure 2:
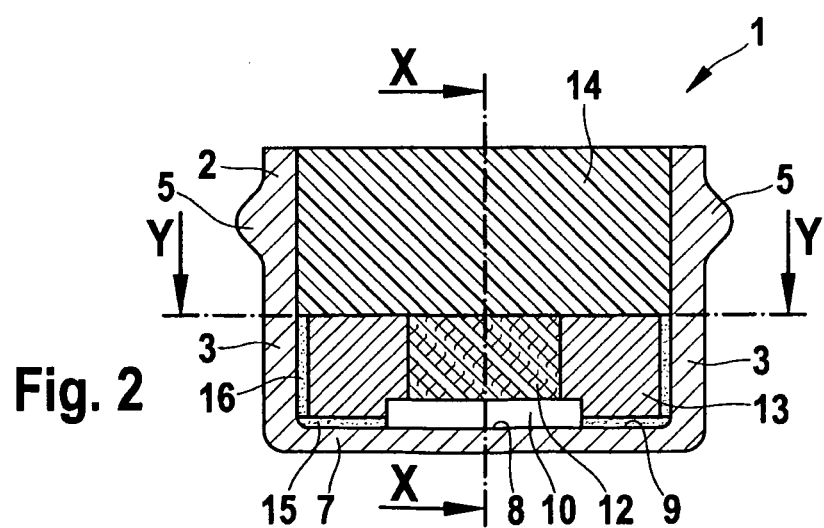
FIG. 2 shows a schematic sectional view of a first exemplary embodiment of an ultrasonic transducer according to the present invention.

FIG. 2 shows a schematic sectional representation of a first exemplary embodiment of an ultrasonic transducer 1 according to the present invention, having damping elements 12, 13 and 14.

Above transducer element 10, concentrically with the center axis of diaphragm pot 2, a first damping element 12 is situated, in this example a certain edge region of the upper side of transducer element 10 not being covered by damping element 12. First damping element 12 may, for instance, be a stamped insertion part which is fastened to transducer element 10 using a double-sided adhesive tape or an adhesive. The first damping element is, for instance, a felt material or a foam substance part, and has a low damping value. Concentrically around this first damping element 12, above edge section 9 of diaphragm 7, a second damping element 13 is situated that has a high damping value, it being connected with force locking to a first fastening element 15 and to the inner wall 4 of diaphragm pot 2 using a second fastening element 16. It is preferred that this force-locking connection be developed in a planar manner. Fastening elements 15, 16 may be certain adhesives, for example, in one embodiment. Because of this fastening, a diagonal stiffening comes about between wall 3 and diaphragm 7, on account of which, during operation of ultrasonic transducer 1, tilting motions and creasing motions of wall 3 are taken up by second damping element 13 with respect to the plane of diaphragm 7, and, for the damping, are converted into thermal energy.

First and second damping elements 12 and 13 extend in the direction of the center axis of diaphragm pot 2, to a determinable height previously measured from the inside of diaphragm 7, which preferably has the same magnitude for both. On this upper end thus formed of damping elements 12 and 13 there is a third damping element 14 which fills upper internal space 19 of diaphragm pot 2 up to its upper edge of opening 16 and seals it. In one exemplary embodiment, third damping element 14 is a two-component elastomer.

Consequently, this construction has a selective damping according to functional requirements: The useful vibration of diaphragm 7 in transducer section 8 is provided by damping element 12 with low damping, the wall vibrations or the tilting motion modes/creasing motion modes of the wall relative to the diaphragm being strongly damped by second damping element 13.

Figure 3:
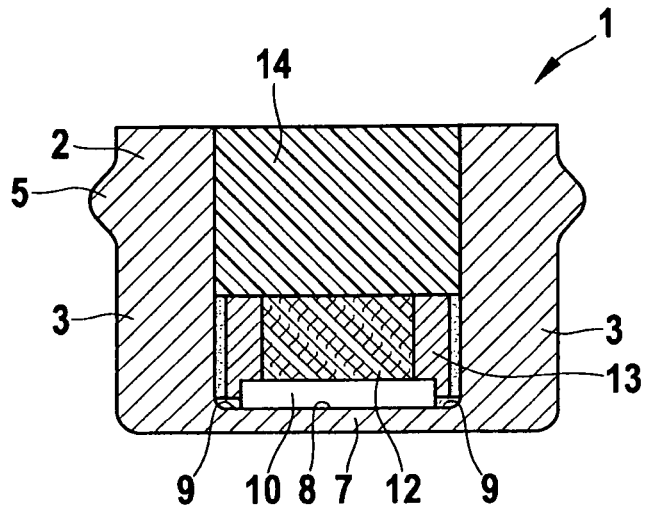
FIG. 3 shows a schematic sectional representation of the first exemplary embodiment along sectional lines X-X, according to FIG. 2.
Figure 4:
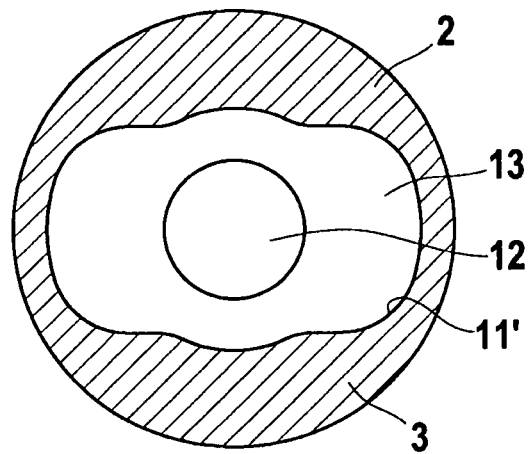
FIG. 4 shows a schematic sectional representation of the first exemplary embodiment along sectional lines Y-Y, according to FIG. 2.

FIG. 3 shows a sectional view of the first exemplary embodiment according to FIG. 2, along sectional lines X-X. The inner cross section of diaphragm pot 2 in this case has a special shape, which is shown in FIG. 4, of a sectional view along sectional lines Y-Y as in FIG. 2. This shape has a contour 11' which, in this example, is made up of an oval-like and a circular recess. First damping element 12 is developed here having a circular cross section and is surrounded by second damping element 13, which in its outer shape has contour 11 (see FIG. 6) of contour 11' of the inner wall of diaphragm pot 2. One may recognize in this embodiment that contour 11 extends oval-like in a transverse axis if diaphragm pot 2 and circular section-shaped in a transverse action that is situated at right angles to the former, whereby different wall thicknesses of diaphragm pot 2 come about, which influence the directional characteristics of ultrasonic transducer 1.

Figure 5:
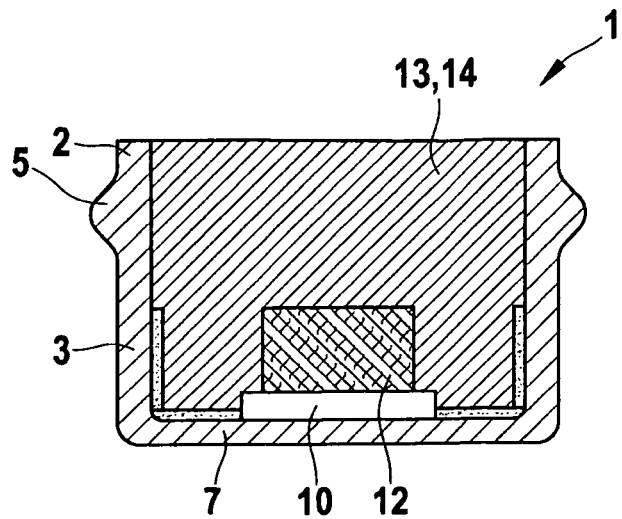
FIG. 5 shows a schematic sectional view of a second exemplary embodiment of an ultrasonic transducer according to the present invention.

FIG. 5 shows a schematic sectional representation of a second exemplary embodiment of ultrasonic transducer 1 according to the present invention, second damping element 13 being developed in one piece with third damping element 14.

Figure 6:
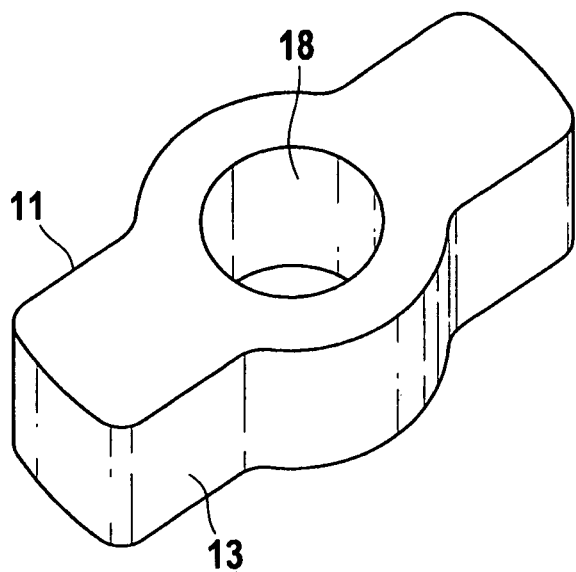
FIG. 6 shows a perspective view of an exemplary damping element.
Figure 7:
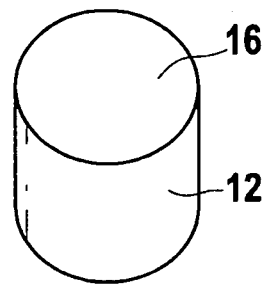
FIG. 7 shows a perspective view of an additional exemplary damping element.

Finally, FIGS. 6 and 7 show damping elements 13 and 12 as insertion component parts. In this embodiment second damping element 13 is stamped from an elastomeric material to have the dimensions of the internal space 19 of diaphragm pot 2 at a certain height and has a through hole 18 for first damping element 12, which in this example has a cylindrical shape.

In another embodiment, upper side 16 of first damping element 12 has a larger diameter than its lower side, as a result of which an advantageous clamping is able to occur when first damping element 12 is set into through hole 18 of second damping element 13.

We shall now mention three different methods for producing ultrasonic transducer 1, which are not restrictive, however.

In the case of insertion parts, second damping element 13 is first adhered into the lower region of inner space 19 of diaphragm pot 2 in such a way that it is connected with force locking to the inside of diaphragm 7, at edge section 9, with its lower side, and with its outer side to the inside of wall 3 of diaphragm pot 2. First damping element 12 is then set into through hole 18 of the second damping element, its lower side being connected to the upper side of transducer element 10, using an adhesive band, for instance. Adhering the outer side of first damping element 12 to second damping element 13 in through hole 18 is also conceivable. In the case of felt as the material for first damping element 12, one may do completely without adhesion in the direction of second damping element 13 or diaphragm 7. First damping element 12, made of felt, then is held fixed in through hole 18 solely because of its shaping, such as a slight oversize or conicity.

In another version, as was mentioned above, first damping element 12 is mechanically held fixed in through hole 18, based on its different diameters or widths. This applies exactly to the felt material, having a slightly wider diameter with respect to through hole 18.

Thereafter, third damping element 14 is applied into the remaining volume of diaphragm pot 2, for instance, cast in the form of a two-component elastomer. With that, the inner space of diaphragm pot 2 is additionally sealed at the same time.

A further production method provides that, first of all, a shape or a core having the shape of first damping element 12 is applied, in a removable manner, onto transducer element 10. Then, second damping element 13, in the form of a fluid elastomer, is filled into the edge region around the core, and is cured thermally. In this case, the fluid level of the still fluid elastomer corresponds to the height of the upper side of the core, which has the dimensions of first damping element 12. After the curing of second damping element 13, the core, which has formed a through hole 18 for first damping element 12, is removed again and replaced by first damping element 12, which is set in as described above. A force-locking bond of second damping element 13 with edge section 9 of diaphragm 7 and the inside of wall 3 of diaphragm pot 2 is formed by the elastomer of second damping element 13 itself. Third damping element 14 is then inserted into the remaining volume of diaphragm pot 2, as explained above.

In one especially preferred production method, first damping element 12 is fastened concentrically as "lost core" on transducer element 10, using a double-sided adhesive band or transfer adhesive. An elastomer is poured as second damping element 13 into the edge region about first damping element 12 and is cured, the above-mentioned force-locking connection forming to diaphragm 7 and wall 3. Third damping element 14 is then inserted into the remaining volume of diaphragm pot 2, as explained above. In an additional simplification step, second and third damping elements 13 and 14 are produced in the same casting step and of the same material.

Experiments have shown that using such an arrangement of a selective damping and diagonal stiffening of the diaphragm pot 2 of an ultrasonic transducer 1, transient values are achievable that are advantageously less than 20 cm. In this context, an outer decoupling ring (not shown) is not necessary, since the wall modes are damped, because of the present invention, to a level that is almost no longer detectable using measuring technology. The principle of the above damping superstructures includes diaphragm superstructures in which piezoelectric transducer element 10 lies, for example, on a platform on diaphragm 7 or is applied in a recess of diaphragm 7.

The present invention is not limited to the exemplary embodiments described above, but is modifiable in a variety of ways.

The above-described contours 11, 11' may, of course, have other shapes, for instance, the shape of a drop.

When using a fluid material for second damping element 13, it is especially preferred that first damping element 12 is developed using a closed-pore foam material, since in that way a defined transition region is advantageously made possible between the outer wall of first damping element 12 in through hole 18 to second damping element 13.

An elastomer has proven itself for second damping element 13 which is laced with microballoons, since damping parameters may advantageously be set ahead of time.

What is claimed is:

1. An ultrasonic transducer for a vehicle, comprising:
   a diaphragm pot having a surrounding wall and a diaphragm;
   a transducer element configured to generate ultrasonic vibrations, wherein the transducer element is mounted in the diaphragm pot on a transducer section on an inner side of the diaphragm;
   a first damping element configured to damp the diaphragm, wherein the first damping element is situated in the diaphragm pot on the transducer element; and
   a second damping element configured to damp vibrations of the surrounding wall, wherein the second damping element is situated in the diaphragm pot in an edge section of the diaphragm around the transducer element;
   wherein the second damping element is connected in a force-locking manner to both the edge section and an inner side of the surrounding wall,
   wherein the second damping element is directly connected to the transducer element.

2. The ultrasonic transducer as recited in claim 1, further comprising:
   a third damping element provided above the first and the second damping elements in the diaphragm pot, wherein the third damping element is configured to provide at least one of additional damping and sealing of the diaphragm pot.

3. The ultrasonic transducer as recited in claim 1, wherein the first damping element includes a material having a low damping value and the second damping element includes a material having a high damping value.

4. The ultrasonic transducer as recited in claim 1, wherein the first damping element and the second damping element are configured as insertion component parts.

5. The ultrasonic transducer as recited in claim 4, wherein the second damping element has a contour complementary to a contour of the diaphragm pot, and wherein the second damping element has a through hole configured to accommodate the first damping element.

6. The ultrasonic transducer as recited in claim 1, wherein the first damping element is configured as an insertion component part, and wherein the second damping element is produced from a casting material in the diaphragm pot.

7. The ultrasonic transducer as recited in claim 6, wherein the second damping element is an elastomer which has microballoons.

8. The ultrasonic transducer as recited in claim 2, wherein the third damping element is made from a casting material, and wherein the casting material is a two-component elastomer.

9. The ultrasonic transducer as recited in claim 1, wherein the first damping element includes a foam material.

10. The ultrasonic transducer as recited in claim 9, wherein the foam material has closed pores.

11. The ultrasonic transducer as recited in claim 2, wherein the third damping element is configured as one piece with the second damping element.

12. The ultrasonic transducer as recited in claim 1, wherein the first damping element and the second damping element each have a predetermined height that is measured perpendicularly to the inner side of the diaphragm.

13. The ultrasonic transducer as recited in claim 12, wherein the first damping element and the second damping element have a predetermined equal height that is measured perpendicularly to the inner side of the diaphragm.

14. An ultrasonic transducer for a vehicle, comprising:
    a diaphragm pot having a surrounding wall and a diaphragm;
    a transducer element configured to generate ultrasonic vibrations, wherein the transducer element is mounted in the diaphragm pot on a transducer section on an inner side of the diaphragm;
    a first damping element configured to damp the diaphragm, wherein the first damping element is situated in the diaphragm pot on the transducer element; and
    a second damping element configured to damp vibrations of the surrounding wall, wherein the second damping element is situated in the diaphragm pot in an edge section of the diaphragm around the transducer element;
    wherein the second damping element is connected in a force-locking manner to both the edge section and an inner side of the surrounding wall,
    wherein a width of an upper side of the first damping element is greater than a width of a lower side of the first damping element, and wherein the width of the upper side of the first damping element is greater than a width of a through hole of the second damping element.

* * * * *

UNITED STATES PATENT AND TRADEMARK OFFICE
CERTIFICATE OF CORRECTION

PATENT NO.       : 8,587,182 B2
APPLICATION NO.  : 12/308300
DATED            : November 19, 2013
INVENTOR(S)      : Martin Reiche It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1077 days.

Signed and Sealed this
Twenty-second Day of September, 2015

Michelle K. Lee
*Director of the United States Patent and Trademark Office*